US010762669B2

(12) United States Patent
Batra et al.

(10) Patent No.: US 10,762,669 B2
(45) Date of Patent: Sep. 1, 2020

(54) COLORIZATION OF VECTOR IMAGES

(71) Applicant: Adobe Inc., San Jose, CA (US)

(72) Inventors: Vineet Batra, Delhi (IN); Mridul Kavidayal, Noida (IN); Harish Kumar, Noida (IN); Ankit Phogat, Delhi (IN)

(73) Assignee: ADOBE INC., San Jose, CA (US)

( * ) Notice: Subject to any disclaimer, the term of this patent is extended or adjusted under 35 U.S.C. 154(b) by 190 days.

(21) Appl. No.: 15/981,496

(22) Filed: May 16, 2018

(65) Prior Publication Data

US 2019/0355154 A1 Nov. 21, 2019

(51) Int. Cl.
| | | |
|---|---|---|
| *G06T 11/00* | (2006.01) | |
| *G06T 9/00* | (2006.01) | |
| *G06T 7/529* | (2017.01) | |
| *G06T 7/13* | (2017.01) | |
| *G06T 7/90* | (2017.01) | |

(52) U.S. Cl.
CPC .............. *G06T 11/001* (2013.01); *G06T 7/13* (2017.01); *G06T 7/529* (2017.01); *G06T 7/90* (2017.01); *G06T 9/00* (2013.01); *G06T 2207/10024* (2013.01); *G06T 2207/10028* (2013.01); *G06T 2207/20081* (2013.01)

(58) Field of Classification Search
None
See application file for complete search history.

(56) References Cited

U.S. PATENT DOCUMENTS

| 10,482,607 | B1* | 11/2019 | Walters | ................ | G06K 9/6265 |
| 2002/0003897 | A1* | 1/2002 | Tanaka | ..................... | G06T 9/00 |
| | | | | | 382/165 |
| 2013/0044945 | A1* | 2/2013 | Nykyforov | ............ | G06K 9/325 |
| | | | | | 382/165 |
| 2019/0261717 | A1* | 8/2019 | Schultz | ................. | G06T 19/006 |
| 2019/0355154 | A1* | 11/2019 | Batra | ........................ | G06T 7/13 |
| 2019/0385302 | A1* | 12/2019 | Ngo Dinh | .......... | A61B 1/00009 |
| 2019/0392196 | A1* | 12/2019 | Sagonas | ............ | G06K 9/00442 |
| 2020/0013205 | A1* | 1/2020 | Kavidayal | .............. | G06N 3/084 |

OTHER PUBLICATIONS

"Generative adversarial network", downloaded from https://en.wikipedia.org/wiki/Generative_adversarial_network, Apr. 25, 2018, 3 pages.
Asente, Paul, et al., "Dynamic Planar Map Illustration", ACM Transactions on Graphics, vol. 26, No. 3, Article 30, Publication date: Jul. 2007, 10 pages.
Isola, Phillip, et al., "Image-to-Image Translation with Conditional Adversarial Networks", arXiv:1611.07004v2, Nov. 22, 2017, 17 pages.
Sangkloy, Patsorn, et al., "Scribbler: Controlling Deep Image Synthesis with Sketch and Color", In IEEE Conference on Computer Vision and Pattern Recognition (CVPR), vol. 2. 2017, 13 pages.

* cited by examiner

*Primary Examiner* — Iman K Kholdebarin

(74) *Attorney, Agent, or Firm* — F. Chau & Associates, LLC

(57) ABSTRACT

Systems and techniques are described for colorizing vector images. Color raster images that correspond to the vector images are used to perform a color mapping to colorize the vector images. The vector images are represented using non-overlapping planar arrangements of faces of the vector images, so that the color mapping may be performed with respect to the faces. The faces may be processed in parallel, to further facilitate a speed and scalability of the describes processes and results.

20 Claims, 6 Drawing Sheets

| 802 Dark blue |
| 803 Light blue |
| 804 Light blue |
| 806 Light blue |
| 808 Light brown |
| 810 Black |
| 812 Brown |
| 814 Dark brown |

| 902 Dark blue |
| 904 Light blue |
| 906 Light blue |
| 908 Light brown |
| 910 Black |
| 912 Brown |
| 914 Dark brown |

COLORIZATION OF VECTOR IMAGES

TECHNICAL FIELD

This description relates to digital image editing.

BACKGROUND

Digital image editing refers generally to the use of computer software and associated hardware to access a digital image file and perform modifications on the image of the digital image file. In particular, it may be desirable to perform colorization of such an image. That is, for example, one aspect of the technical field of digital image editing includes editing an image to change a color of an object in that image.

In practice, digital images may be constructed, stored, and rendered on a screen, using different techniques. For example, a raster image generally defines a digital image on a pixel-by-pixel basis. In another example, a vector image generally defines a digital image in terms of geometric shapes.

Existing colorization techniques include the use of machine learning, e.g., neural networks, to colorize a raster image. Raster images, however, may have varying levels of resolution or other measures of quality. For example, a raster image may have a given pixel density, e.g., dpi (dots per inch). In general, a raster image may not be scalable to a desired extent. For example, a raster image with a given number of pixels may appear suitable at a first size, but may appear pixilated or otherwise distorted if scaled up to a second, larger size.

On the other hand, vector images are generally scalable to a desired size. For example, a vector image can be scaled by mathematically increasing each of the included geometric shapes proportionally, and then rendering the result.

As referenced above, existing colorization techniques are optimized for raster images. As a result, colorized vector images may be low-quality, and/or may be laborious and time-consuming for users to construct (e.g., may be constructed manually). Thus, even to the extent that automated colorization may be available, the existing techniques produce low-quality results, and require excessive computing resources and/or time to reach a desired result.

SUMMARY

According to one general aspect, a computer program product is tangibly embodied on a non-transitory computer-readable storage medium and includes instructions that, when executed by at least one computing device, are configured to cause the at least one computing device to receive a vector image, the vector image corresponding to a raster image that includes colored pixels, and generate face pixels of a face within a planar map of the vector image, the face having a depth value within the vector image. The instructions, when executed by the at least one computing device, are further configured to cause the at least one computing device to obtain color values for the face pixels, including mapping the face pixels to corresponding colored pixels of the colored pixels of the raster image, based on the depth value, and assign a color derived from the color values to the face, to obtain a colorized vector image.

According to another general aspect, a computer-implemented method includes receiving a vector image, the vector image corresponding to a raster image that includes colored pixels, and generating face pixels of a face within a planar map of the vector image, the face having a depth value within the vector image. The method further includes obtaining color values for the face pixels, including mapping the face pixels to corresponding colored pixels of the colored pixels of the raster image, based on the depth value, and assigning a color derived from the color values to the face, to obtain a colorized vector image.

According to another general aspect, a computer program product is tangibly embodied on a non-transitory computer-readable storage medium and includes instructions that, when executed by at least one computing device, are configured to cause the at least one computing device to receive a vector image, the vector image including geometric paths, colorize a raster image, using a neural network, to obtain a colorized raster image, and construct a depth mask for a planar map of the vector image, in which a first face and a second face of the planar map are defined with respect to an overlapping portion of at least two of the geometric paths. The instructions, when executed by the at least one computing device, are further configured to cause the at least one computing device to rasterize the first face to obtain first face pixels, the first face pixels having a first depth value within the depth mask, and map corresponding pixels of the colorized rasterized image to the first face pixels, to obtain first color values for the first face pixels. The instructions, when executed by the at least one computing device, are further configured to cause the at least one computing device to assign a first color, derived from the first color values, to the first face, map corresponding pixels of the colorized rasterized image to the second face, to obtain second color values for second face pixels of the second face, and assign a second color, derived from the second color values, to the second face.

The details of one or more implementations are set forth in the accompanying drawings and the description below. Other features will be apparent from the description and drawings, and from the claims.

DETAILED DESCRIPTION

Figure 1:
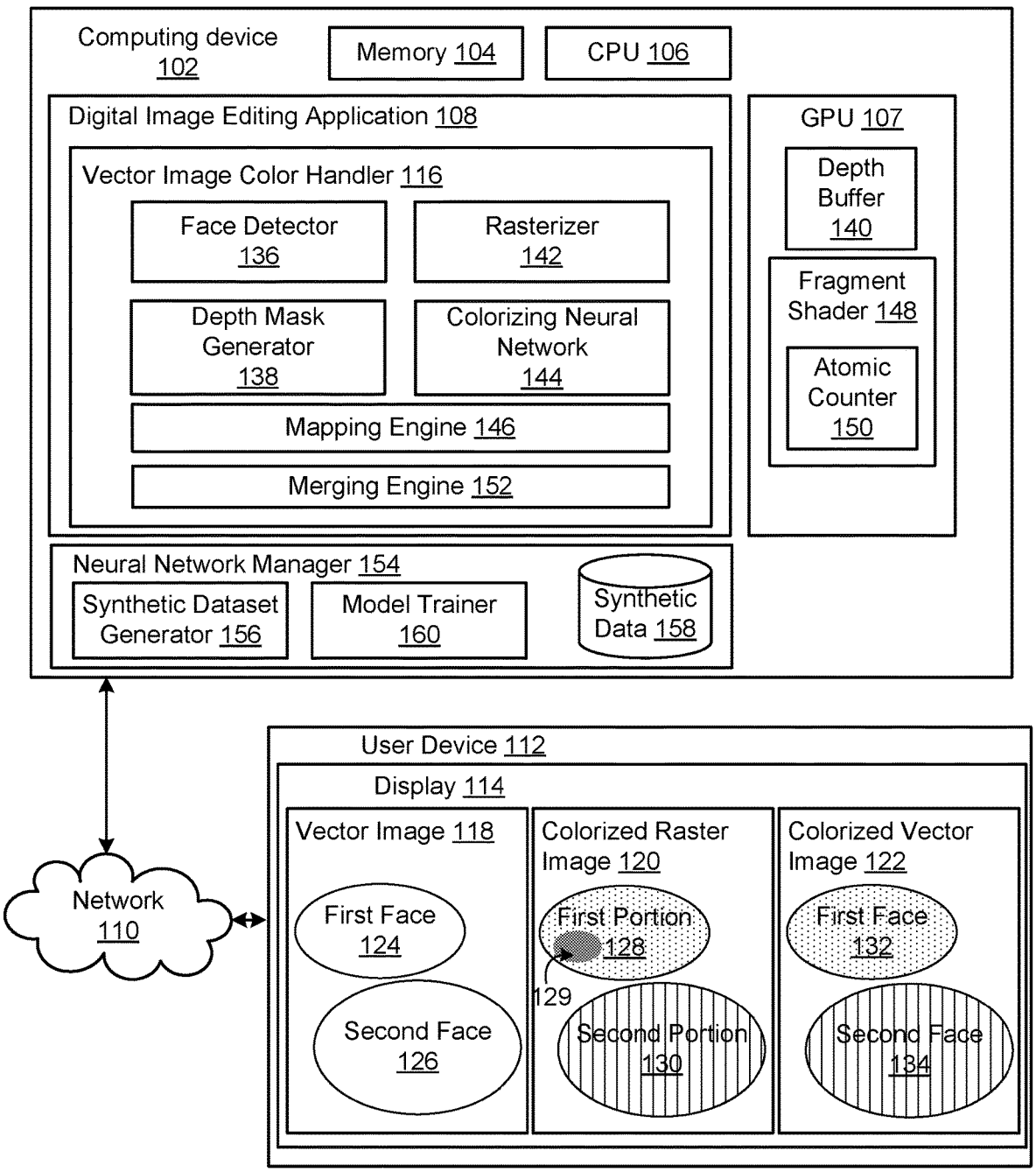
FIG. 1 is a block diagram of a system for digital image editing for colorization of vector images.

This document describes systems and techniques that provide for colorization of vector images. Such systems and techniques overcome technical challenges of previous systems and techniques, and improve the process(es) to perform related manual, automated, and/or non-automated processing. For example, as referenced above, existing techniques are optimized for colorizing raster images. Therefore, a problem exists that although vector images are desirable or necessary for many uses of digital images, no adequate techniques exist for performing automated colorization of vector images. Instead, vector images are colorized in a low-quality manner, and/or are colorized manually (e.g., by manual designation of colors on a shape-by-shape basis within a selected vector image).

The described digital image editing techniques utilize an efficient, fast, accurate, complete, and widely-applicable algorithm(s) to colorize vector images. For example, the described systems and techniques utilize techniques for colorizing raster images using machine learning (e.g., neural networks), and enable a mapping of colors of the resulting, colorized raster image to colors of a corresponding vector image.

In the following description, a vector image and a raster image (or portions thereof) are described as "corresponding" to one another, whenever the two images (or portions thereof) are mapped to one another for purposes of assigning color values based on the mapped correspondence. For example, a vector image portion may be said to correspond to a raster image portion of a corresponding raster image, when the color value(s) of the vector image portion is/are derived from one or more color values of the raster image portion.

Typically, to obtain corresponding vector/raster image pairs, a vector image may be converted to a raster image (i.e., rasterized), or, conversely, a raster image could be converted into a vector image (i.e., vectorised). In some scenarios, a vector image and a raster image could be created separately, but with corresponding, mapped portions.

Using conventional techniques, it would be difficult or impossible to accurately determine a manner in which portions of the raster image would correspond, or map, to portions of the vector image for purposes of color assignment within the vector image. Moreover, even if corresponding portions are mapped correctly, the resulting colorized vector image may be low quality, and computational requirements may be unacceptably high.

For example, for a given vector image, a corresponding raster image is colorized (using machine learning techniques) on a pixel-by-pixel basis. As a result, each pixel may have a somewhat different color value than that of its neighboring pixels. For example, an image of the sky may have differing shades of blue. While potentially acceptable for a given raster image in isolation, it may be problematic or unacceptable to map the resulting color shades to the corresponding vector image to obtain a colorized vector image. For example, individual shapes within the resulting colorized vector image may appear mottled or uneven.

In contrast, using the techniques below, a vector image is represented as a planar arrangement or planar map, in which individual planar "faces" are defined within each shape (or path) of the vector image, so that each shape may include one or more faces. For example, two partially-overlapping circles are defined as having three faces, including the two non-overlapped portions, as well as the third, overlapping portion of the upper/higher circle. In this way, the faces reflect and define a manner and extent to which the shapes overlap one another within the vector image. For example, in the above example and despite being a planar representation, each face is assigned a depth value that thus designates which of the two circles is the upper circle within the original vector image.

Then, each face may be rasterized, i.e., converted to a pixel-by-pixel representation, to obtain corresponding face pixels. In this way, the described techniques make it easy to proceed with a pixel-by-pixel mapping between the face pixels and the corresponding pixels of the colorized raster image. For example, in some implementations, a vector image to be colorized may be rasterized twice (in parallel), so that a first rasterized image may be colorized using a neural network, while a second rasterized image is determined from faces of a planar map of the vector image, where each face has a depth value relative to remaining faces of the planar map. The second rasterized image may thus be said to include face pixels, since the pixels of the second rasterized image are determined with respect to the previously-defined faces of the planar map of the original vector image.

In particular, each face may be processed (e.g., rasterized and stored in a depth buffer(s)) in parallel, using parallel processing techniques, e.g., in the context of a Graphics Processing Unit (GPU), to execute colorization of a vector image in a fast and efficient manner. Consequently, the digital image editing techniques provide for the new computer functionality of, e.g., colorizing digital vector images in a highly configurable manner, while requiring minimal technical expertise on a part of a user of the digital image editing software application.

For example, a user may simply provide a vector image for colorization. The automated processing described herein may then construct a planar map of faces of the vector image, including storing resulting face pixels and associated depth values, using a depth buffer of a GPU (e.g., each face and corresponding set of face pixels will have a particular depth value and be stored together as such within the depth buffer). Further, the automated processing may convert the vector image to a corresponding raster image, and then proceed to map pixels of the colorized raster image to corresponding face pixels stored in the GPU depth buffers.

To avoid a mottled or uneven appearance of the resulting colorized vector image, each face pixel of a set of face pixels may be normalized, e.g., set to the same color value. For example, a given face may have face pixels that vary somewhat in color, but may be assigned an average color value of all the included face pixels for that face. In this way, each face, and ultimately each shape composed of two or more faces, may be assigned a single, suitable color.

The systems and techniques provide a user interface within the application to enable users to designate a vector image for colorization. As compared to colorization of raster images, the systems and techniques allow for use of vector images as inputs, as well as easy scalability of the colorized images that are thus obtained.

As described in detail below, example techniques include the use of various types of machine learning and associated algorithms and models to colorize raster images corresponding to vector images, and ultimately to map the resulting, colorized raster images to the corresponding vector images, to thereby obtain the desired colorized vector images. In this way, or using additional or alternative techniques, it is possible to create and edit vector images, including colorization thereof. Such editing may be performed quickly and easily, and at large scales (e.g., a detailed complex image may be edited, and/or many images may be edited together).

Additionally, the systems and techniques described herein advantageously improve existing technology areas. For example, as described, computer-based digital image editing is improved. Further, the systems and techniques may be used for a more automated and more efficient and faster approach to generating desired digital images.

FIG. 1 is a block diagram of a system 100 for digital image editing for colorization of vector images. The system 100 includes a computing device 102 having at least one memory 104, at least one CPU (central processing unit) 106, and at least one graphics processing unit (GPU) 107. The system 100 also includes at least one application 108.

The computing device 102 may communicate with one or more other computing devices over a network 110. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform various functions over a network.

The processor 106 represents at least one processor, as referenced therein, and may thus represent two or more processors on the computing device 102 executing in parallel, and utilizing corresponding instructions stored using the at least one memory 104. The at least one memory 104 represents at least one non-transitory computer-readable storage medium. Thus, similarly, the at least one memory 104 may represent one or more different types of memory utilized by the computing device 102. In addition to storing instructions, which allow the at least one processor 106 to implement the application 108 and its various components, the at least one memory 104 may be used to store data.

The GPU 107, as referenced above and described in detail, below, may be used for providing parallel processing of digital image data during the operations of the system 100. Both the CPU 106 and the GPU 107 may themselves include various types and amounts of memories (e.g., buffers, caches) used to store instructions or data.

The network 110 may be implemented as the Internet, but may assume other, different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application 108 may be accessed directly by a user of the computing device 102, at the computing device 102. In other implementations, the application 108 may be running on the computing device 102 as a component of a cloud network where a user accesses the application 108 from another computing device (e.g., user device 112) over a network, such as the network 110. In one implementation, the application 108 may be a digital image editing application, or another type of application that accesses digital image editing functionality. In other implementations, the application 108 may be a stand-alone application that is designed to work with a digital image editing application (e.g., running on the user device 112). In still other alternatives, the application 108 may be an application that runs, at least partially, in another application, such as a browser application. Of course, the application 108 may be a combination of any of the above examples, as well.

In the example of FIG. 1, the user device 112 is illustrated as including a display 114. The display 114 may represent a graphical user interface of the application 108, and/or a browser application used to access the application 108, as just referenced.

In the example of FIG. 1, the application 108 includes, or has access to, a vector image color handler 116. As described herein, the vector image color handler 116 is configured to enable realistic, accurate editing of a vector image 118, using a corresponding raster image 120, to obtain a colorized vector image 120.

In this regard, a "vector image" refers to a digital image file in which a digital image is constructed using, or defined in terms of, geometric shapes or mathematical formulas. For example, a vector image may include a circle that is defined in terms of its radius. Complex images may be constructed using combinations of various shapes/formulas. Vector images may also be referred to as, or include, vector graphics.

Meanwhile, a "raster image" refers to an image that is constructed using a fixed number or array of pixels. That is, for example, individual pixels may be colored, arranged, or otherwise defined as a group of pixels that, in total, provide a desired image.

Vector images are associated with various file formats, such as SVG (scalable vector graphics), PDF (portable document format), EPS (encapsulated postscript), or AI (Adobe Illustrator), to name a few examples. Raster images are associated with file formats, as well, such as JPEG/JPG (joint photographic experts group), PNG (portable networks graphic), GIF (graphics interchange format), or TIFF (tag interchange file format), to name a few examples. Of course, in some cases, a given file format may be used to include or incorporate multiple types of images or other content (e.g., text), such as a PDF document that includes text, as well as one or both of vector and raster images.

It is frequently desirable to add color to a digital image. In this regard, "colorizing" generally refers to a process for adding or modifying a color within a digital image. Colorizing may include, for example, changing a black-and-white image to a color image. Colorizing may include adding color to (or changing existing colors within) individual elements of a digital image, or to the digital image as a whole. Colorizing may be performed with respect to virtually any digital image, with a goal of, e.g., producing a realistic representation of an original scene or element, or of producing an artistic rendering of a scene/element having a desired aesthetic effect.

As described in detail below, it is feasible to use neural network(s) (such as a colorizing neural network 138) to colorize a raster image, such as the colorized raster image 120. For example, such a neural network may predict a color of a pixel of a raster image, based on a suitable training set.

It is also possible to change a color within a vector image. For example, an artist working with Adobe Illustrator may select a shape within a vector image file and designate a desired color from an available palette. In another example, vector images generated using XML (eXtensible Markup Language) may be modified to include a desired color by altering the underlying XML code.

However, such existing options for colorizing a vector image tend to be inconvenient, time-consuming, and/or error prone. Further, conventional techniques are generally inapplicable or of limited use with respect to large-scale colorization operations, such as colorizing a large quantity of vector images, and/or colorizing complex vector images. For example, such complex images may include vector images with a number of overlapping or obscured portions, or any vector image intended to have a three-dimensional aspect.

In the system 100 of FIG. 1, as explained in detail below, the vector image color handler 116 is configured to analyze the vector image 118 to identify individual faces therein, illustrated in FIG. 1 as a first face 124 and a second face 126. As described in detail below, faces may be defined with respect to paths within the vector image 118, where the paths correspond to the geometric shapes of the vector image 118.

In this regard, the term "face" should be understood in the general sense to refer to any surface or side of any element or aspect within the vector image 118 that faces, and is visible to, the viewer of the vector image 118. More particularly, the term "face" should be understood to be identified within a planar arrangement, or planar map, of image elements or objects within the vector image 118, where the image elements/objects themselves are defined with respect to geometric paths. Put another way, the vector image 118 includes a first geometric path (a first ellipse) that happens to define the first face 124, as well as a second geometric path that happens to define the second face 126 (a second ellipse). In the simplified example of FIG. 1, the first face 124 is illustrated separately from the second face 126. In this simplified scenario, as shown, each face corresponds, or maps to, a single path.

Figure 2:
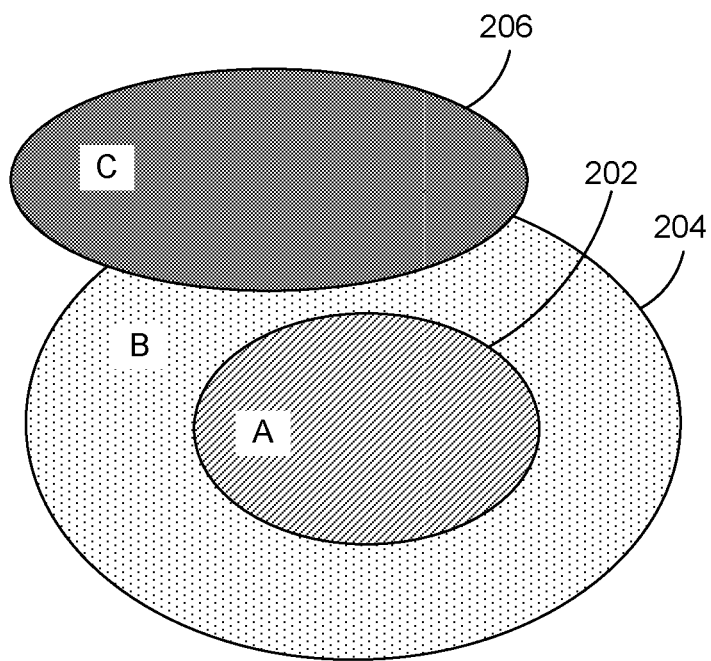
FIG. 2 illustrates a first example of a vector image used to generate a depth mask using the system of FIG. 1.
Figure 3:
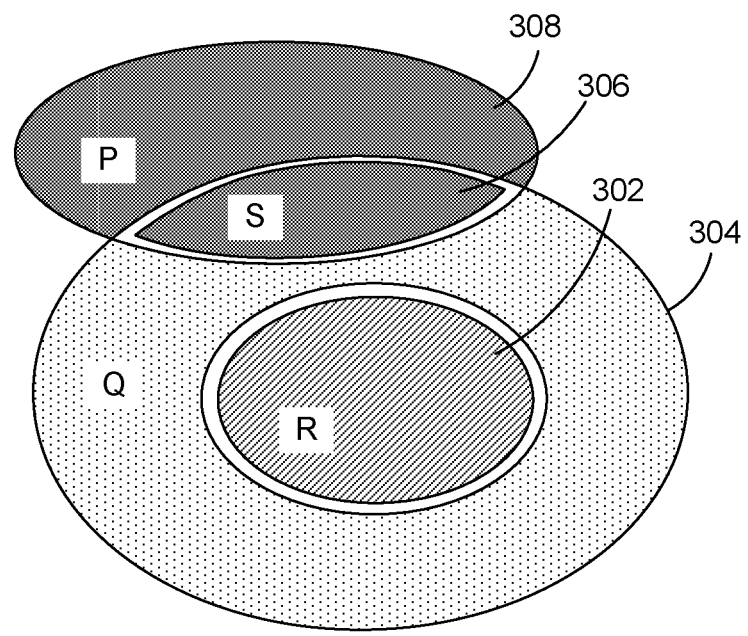
FIG. 3 illustrates a planar arrangement of faces generated using the example of FIG. 2.

In more common scenarios that may be encountered by the vector image color handler 116, it may occur that illustrated paths of a given vector image overlap, or partially obscure, one another. FIG. 2 illustrates such an example, in which a path A 202 is included within a path B 204, which itself is partially overlapped by a path C 206. In these types of scenarios, as shown in FIG. 3, a corresponding planar arrangement generated by the face detector 136 may include a number of planar faces that exceeds the original number of paths, e.g., a resulting planar map may map multiple faces mapped to a single path. In this regard, for example, the path B 204 may be referenced as a compound path, because of the described overlaps.

Thus, in FIG. 3, a face R 302 maps to the path A 202, the face Q 304 maps to the path B 204, and both of face S 306 and face P 308 map to the path C 206. In other words, FIGS. 2 and 3 demonstrate a planar arrangement (or a planarization) of a vector image having three stacked paths (202, 204, 206) into four planar faces (302, 304, 306, 308).

As just referenced, FIG. 2 illustrates a stacked arrangement in which an image element or object is overlapping, and partially obscuring, another image element/object. In other words, and returning to FIG. 1, if the vector image 118 represents a two-dimensional image of a three-dimensional scene/object, then the vector image 118 defines a two-dimensional, x-y coordinate system, and any included paths (and corresponding, detected faces) may be considered to have potentially different values along a z-axis that is perpendicular to both the x and y axes.

In the following description, these z-axis values are referred to as "depth values," which may be accumulated with respect to each face, in order to define a "depth mask" for a corresponding vector image, using the GPU 107 as described below. As may be appreciated from the above description, the faces 124, 126 happen to have a one-to-one correspondence with their defining geometric paths, and may be considered to have the same depth for purposes of simplified example operations of the system 100 of FIG. 1, while the various faces 302-308 of FIG. 3 correspond to stacked or overlapping geometric paths 202-206 of FIG. 2, and would thus have differing depth values.

As illustrated in FIG. 1, the colorized raster image 120 corresponds to the vector image 118, e.g., illustrates the same or similar scene/object(s) as the vector image 120. In some implementations, as described below, the vector image 118 may be derived from the colorized raster image 120 (e.g., from an uncolorized version thereof). Conversely, in other implementations, the vector image 118 may be rasterized to obtain an uncolorized raster image, which may then be colorized using a neural network to obtain the colorized raster image 120.

Regardless of how a corresponding pair of vector/raster images is obtained or derived from one another, it will be appreciated from the present description that the vector image 118 may be used as an input to the vector image color handler 116. Further, the vector image color handler 116 may be configured to colorize a raster image to obtain the colorized raster image 120, and then perform a mapping of colors from the colorized raster image 120 to the vector image 118, to thereby obtain the colorized vector image 122.

Thus, conceptually, the colorized raster image 120 is illustrated as including a first portion 128 (i.e., first group of pixels) that corresponds to the first face 124 of the vector image 118, and a second portion 130 (i.e., second group of pixels) that corresponds to the second face 126 of the vector image 118. However, it will be appreciated from the present description that the correspondence between the images 118/120 need not be an exact, one-to-one correspondence. Rather, as described in detail below, the portions 128, 130 of the colorized raster image 120 represent portions of the colorized raster image 120 that have been identified for mapping colors thereof to the faces 124, 126, respectively, to thereby obtain the colorized vector image 122 having colorized faces 132, 134.

As illustrated in FIG. 1, in addition to identifying the area of colorized raster image 120 labeled first portion 128 in FIG. 1, it may occur that the colorization process performed on, or with respect to, the colorized raster image 120 does not provide a uniform color within the relevant area. For example, the colorized raster image 120 may be colorized by the use of a neural network to predict a color, e.g., a color value, for each individual pixel of the raster image. The color values predicted to occur within the relevant area of the first portion 128 may thus vary on a pixel-by-pixel basis.

This effect is conceptually illustrated in FIG. 1 by a portion 129, understood to have a different color than a remainder of the first portion 128 (e.g., may have a lighter or darker shade of the same color as the color of the remainder of the first portion 128). Although FIG. 1 illustrates a simplified example in which only the portions 128, 129 have differing color values, it will be appreciated that, as referenced above, any or all of the pixels within the first portion 128 may vary in color to some degree with respect to one another.

Nonetheless, as described below in detail, the vector image color handler 116 may be configured to derive or otherwise determine a uniform color to map to the colorized vector image 122, i.e., to define the first face 132 thereof. For example, a color value may be selected for the first face 132 that is an average, median, random, maximum, minimum, or composite color value of the color values of the color values included within the first face 128 (including, or taking into account, colors in the portion 129).

Accordingly, the colorized vector image 122 provides a vector image that is high-quality, scalable, and otherwise advantageous in a manner(s) of vector images in general. Moreover, the colorized vector image 122 may be automatically colorized, even if the original vector image 118 is complex, three-dimensional, includes a large number of items, or otherwise difficult to color. As also referenced, the vector image 118 may be representative of a large number of different vector images to be colorized. In all these and additional scenarios, the vector image color handler 116 is configured to provide colorized vector image(s) 122 in a manner that is fast, automated, inexpensive, and efficient with respect to use of the hardware resources of the computing device 102, such as the memory 104, the CPU 106, and the GPU 107.

In FIG. 1, the vector image color handler 116 is illustrated as including a face detector 136, which is configured to analyze the input vector image 118 and identify the first face 124 and the second face 126. More generally, the face detector 136 may be configured to input the vector image of FIG. 2, for conversion thereof into the planar arrangement of paths illustrated in FIG. 3, to thereby determine the type of face-to-path mapping described above.

Examples of techniques for converting the vector image of FIG. 2 into the planar arrangement of paths illustrated in FIG. 3 are known, and not described herein in further detail, except as may be necessary or helpful in understanding operations of the system 100 of FIG. 1. In general, for example, the classic "painters algorithm," or the conceptually similar "reverse painters algorithm" may be utilized to determine and quantify a stacking order of illustrated paths. In some cases, the vector image 118 may be constructed using a stacking-based illustration system, in which case the defined stacking order may be utilized to generate the planar arrangement.

In general, such stacked illustrations are commonly used, and provide paths that may be edited independently from one another (since the paths do not interact with one another, other than to obscure overlapping portions). In contrast, as described above, planar arrangement or planar maps are broken at intersections between paths, so that individual paths may no longer be editable as a whole.

Once the face detector 136 has identified each non-overlapping face of the generated planar arrangement, a depth mask generator 138 may proceed to determine a corresponding depth value for each of the defined faces. More particularly, as described in detail below with respect to FIG. 5, the depth mask generator 138 may utilize a programmable GPU graphics pipeline of the GPU 107 to assign a unique depth value to all pixels of a corresponding face, e.g., by rasterizing the pixels into a depth buffer 140 of the GPU 107 in sequence.

In other words, by utilizing the separately-defined faces obtained from the face detector 136, the depth mask generator 138 leverages the parallel processing abilities of the GPU 107 to rasterize multiple faces into the depth buffer 140 within the same or overlapping timeframes. For example, the depth mask generator 138 may send the first face 124 and the second face 126 to be rasterized into the depth buffer 140 at the same time.

In the simplified example of FIG. 1, where the first face 124 and the second face 126 do not overlap, the faces 124, 126 would have the same depth value for all the pixels of the first face 124, and for the second face 126. Of course, for the example of FIG. 3, each of the faces 302, 304, 306, 308 may be sent in parallel for rasterization into the depth buffer 140, and each of the faces 302, 304, 306, 308 will be assigned a depth value that corresponds to an original z-axis value of the path(s) to which the corresponding face(s) mapped. For example, the faces 306, 308 would have the same depth value, while the face 304 would have a different depth value than any of the faces 302, 306, 308.

Figure 6:
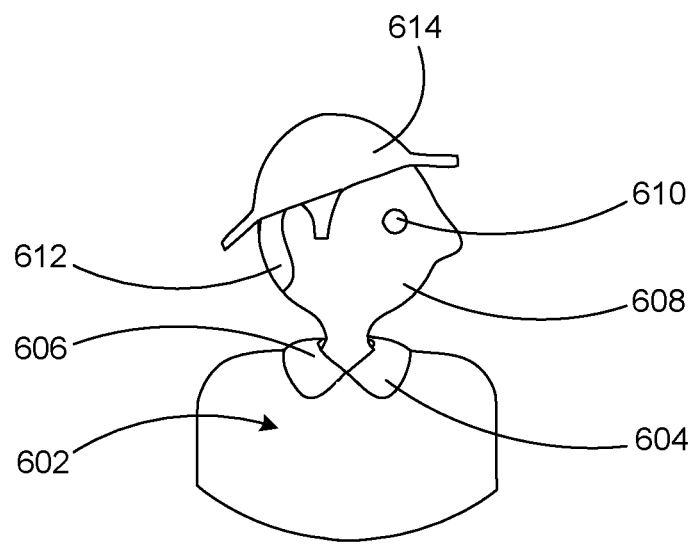
FIG. 6 illustrates an example input vector image in which individual faces have been detected using the system of FIG. 1.
Figure 7:
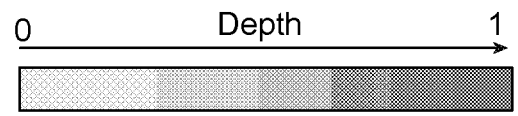
FIG. 7 illustrates a depth mask corresponding to the example image of FIG. 6, generated using the system of FIG. 1.
Figure 7:
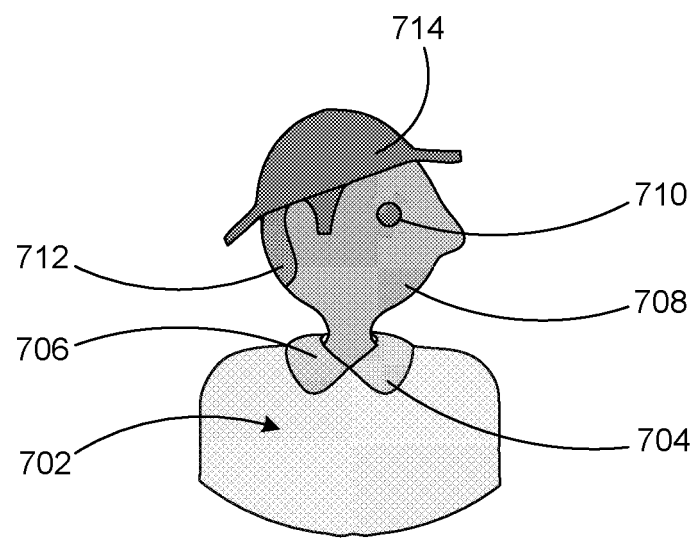

Thus, an example result of the depth mask generator 138 includes rasterized pixels of faces of a processed vector image. FIG. 7 provides an example depth mask for a corresponding planar arrangement of faces for a vector image, illustrated in FIG. 6.

Meanwhile, a rasterizer 142 may be configured to rasterize the vector image 118, or otherwise obtain a raster version thereof (e.g., such as cases in which the vector image 118 was derived from an original raster image).

A colorizing neural network 144 may then be utilized to colorize the relevant raster image, to thereby obtain the colorized raster image 120 of FIG. 1. Further example details regarding the creation and implementation of the colorizing neural network 144 are described below, e.g., with respect to a neural network manager 154.

Once the colorized raster image 120 is obtained, a mapping engine 146 may be configured to utilize the depth mask generated by the depth mask generator 138, along with the colorized raster image 120 generated by the colorizing neural network 144, to thereby rasterize each planar face, and texture map each planar face to the colorized raster image 120, using a depth test based on a corresponding z-value of each face, to accumulate corresponding colorizing pixels for that face.

For example, as described in more detail below, e.g., with respect to FIG. 5, the mapping engine 146 may utilize the graphics pipeline referenced above with respect to the GPU 107, so that a fragment shader stage represented by a fragment shader 148 of the GPU 107 is utilized to perform the color mapping just referenced. An atomic counter 150 represents one or more memory buffers that may be incremented in conjunction with operations of the fragment shader 148. For example, the atomic counter 150 may have count values that are incremented each time the fragment shader 148 is invoked with respect to a particular face. The resulting counter values may be represented as one or more corresponding colors. That is, for example, each count for each pixel of each face may have a corresponding color value, which may be accumulated and copied into the CPU 106, to ultimately determine a color that will be assigned to the relevant face.

For example, as described above with respect to the colorized raster image 120, the first portion 128 may include a plurality of pixels having a particular color value, while also including the portion 129 in which included pixels have one or more different color values. As all of the pixels of the first portion 128, and their corresponding color values, are mapped to the first face 124 by virtue of the operations of the mapping engine 146 just described, it may be necessary for the mapping engine 146 to derive or otherwise determine a single color value that is ultimately designated for use in constructing the first face 132 of the colorized vector image 122. By copying all of the relevant color values from the atomic counter 150, the mapping engine 146 may compute an average of the relevant color values, or any other appropriate mathematical operation or selection process, to obtain the single color used for the first face 132. For example, the relevant color values may be loaded into the CPU 106 for the computation and selection of the derived or composite color.

Finally with respect to the vector image color handler 116, a merging engine 152 is configured to selectively merge or otherwise combine faces that originally belonged to a single or same path. That is, although not applicable in FIG. 1, FIG. 3 illustrates that a face S 306 and the face P 308 may originally be part of the path C 206 of FIG. 2, but may be separated into independently editable planar faces, as described above.

Consequently, once determined color values have been assigned to each of the faces 306, 308, the merging engine 152 may be configured to combine such faces that were, derived from, and previously mapped to, a single path, during operations of the face detector 136. Operations of the merging engine 152 are also described in more detail, below, with respect to FIG. 5.

In the example of FIG. 1, a neural network manager 154 may be utilized to provide (e.g., parameterize) the colorizing neural network 144. For example, as illustrated, the neural network manager 154 may include a synthetic dataset generator 156 that may be parameterized to generate a "ground truth" of pairs of uncolored/colored raster images, to thereby generate synthetic data 158 that may be used by a model trainer 160 to train, and ultimately deploy, the colorizing neural network 144.

For example, the synthetic dataset generator 156 may be provided with color raster images, and may remove the color therefrom to obtain black and white or outline images. In this way, the synthetic data 158 typically includes relevant information (e.g., correct or expected colors for each raster image included therein) that would not normally be expected, needed, or available for operations of the colorizing neural network 144, but that are used for training purposes by the model trainer 160.

For example, such ground truth data may include characteristics of each color raster image. The ground truth data may also include metadata characterizing each image that may be useful in making colorizing predictions with respect to similarly-characterized black and white images that may be received by the coloring neural network 144. For example, such metadata may characterize a source, content, or type of each relevant raster image.

Put another way, the ground truth data of the synthetic data 158 provides correct solutions to the type of problem desired to be solved, i.e., colorizing raster images, so that efforts of the model trainer 160 in producing the same or similar results may be judged accordingly. Once the model trainer 160 succeeds in providing results that sufficiently match the known, correct solutions, the resulting, trained models will be assumed to be configured to input uncolored raster images in the future, and successfully provide resulting, colorized raster images (such as the colorized raster image 120).

The model trainer 160 is thus configured to provide training for one or more neural networks, and related models or algorithms, using the synthetic dataset 158. In general, neural networks provide computational models used in machine-learning that are made up of nodes organized in layers. The nodes may also be referred to as artificial neurons, or just neurons, and perform a function on provided input to produce some output value. Such neural networks generally require a training period to learn parameters (e.g., weights) used to map an input to a specific output.

The model trainer 160 may be configured to execute training, using the training examples of the dataset 158, including executing a series of iterative rounds of training, in which optimal weight values for one or more mapping functions used to map input values to output values are determined. In determining the optimal weights, the model trainer 160 essentially makes predictions based on available data, and then measures the error in the predictions, using the ground truth available in conjunction with the dataset 158. The function used to measure such error levels is often referred to as a loss function, which is generally designed to sum over the relevant training examples, and add to the calculated loss if a prediction was incorrect, or reduce/minimize the calculated loss if the prediction was correct. In this way, the various models may be conceptually understood to be trained to learn from mistakes made during the various iterations of predictions, so that the resulting, trained models, as referenced, will be fast, efficient, and accurate when deployed in the context of the vector image color handler 116.

Of course, the example of the model trainer 160 should be understood to be non-limiting, and that various, additional, or alternative types of machine-learning or deep learning networks may be utilized. For example, adversarial networks may be used, in which two neural networks are used in conjunction with one another to develop the colorizing neural network 144. For example, existing conditional/non-conditional adversarial networks designed to provide general purpose solutions for image to image translation problems may be adapted to provide some or all of the functionality of the colorizing neural network 144 in the example of FIG. 1. Similarly, existing examples of deep adversarial image synthesis architectures may be utilized and adapted to satisfy color constraints with respect to input raster images.

As described herein, however, networks such as those just referenced, and such as those illustrated in the example of FIG. 1, generally receive an input raster image, and produce a same-size colorized raster image. As also described herein, such colorized raster image outputs are typically small in size, incapable of being scaled to larger sizes, and suffer from potentially undesirable color variations. Nonetheless, by leveraging the colorized raster image 120 in the manner described herein, the vector image color handler 116 is able to input the vector image 118, and ultimately provide the colorized vector image 122, which includes all of the advantages and features of vector images, including high image quality and scalability, as well as having desired color characteristics.

Figure 4:
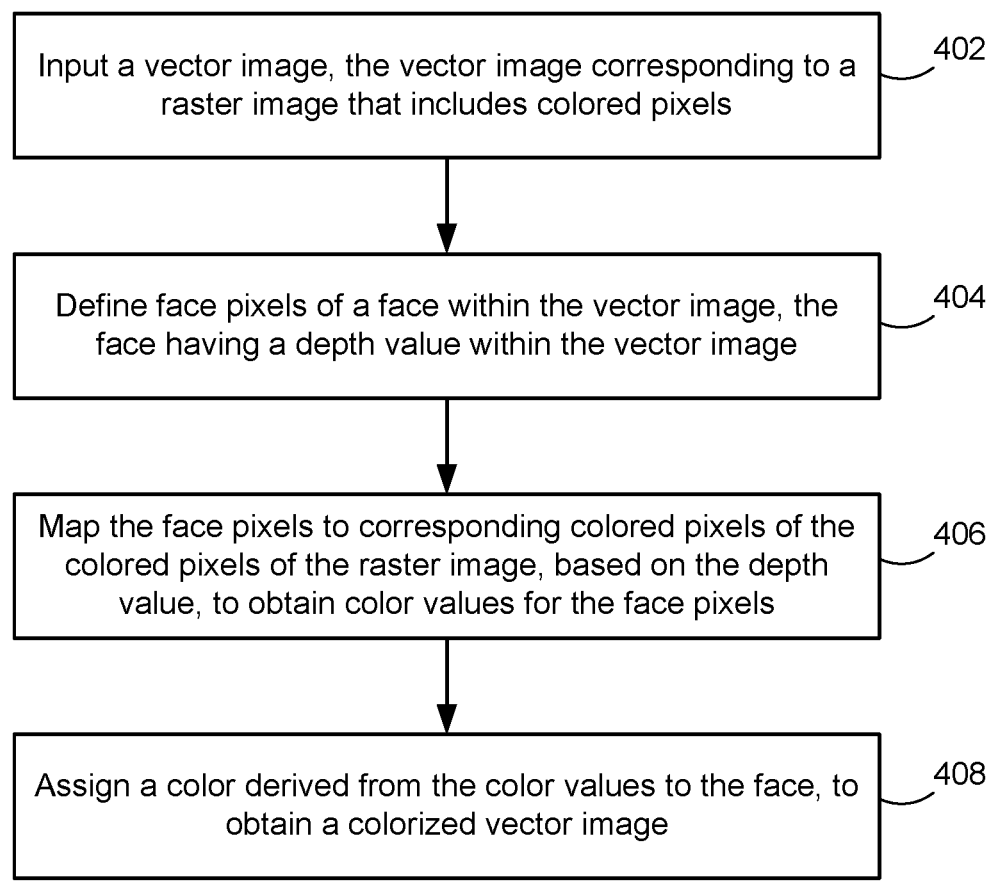
FIG. 4 is a flowchart illustrating example operations of the system of FIG. 1.

FIG. 4 is a flowchart 400 illustrating example operations of the system 100 of FIG. 1. In the example of FIG. 4, operations 402-408 are illustrated as separate, sequential operations. However, it will be appreciated that, in various implementations, additional or alternative operations or sub-operations may be included, and/or one or more operations or sub-operations may be omitted. Further, it may occur that any two or more of the operations or sub-operations may be executed in a partially or completely overlapping or parallel manner, or in a nested, iterative, looped, or branched fashion.

In the example of FIG. 4, a vector image is input, the vector image corresponding to a raster image that includes colored pixels (402). For example, the face detector 136 may be configured to input the vector image 118, where the vector image 118 corresponds to the colorized raster image 120 in one or more of the various manners described above.

Face pixels of a face within the vector image may be defined, the face having a depth value within the vector image (404). For example, the face detector 136 may proceed to detect the first face 124 within the vector image 118. The depth mask generator 138 may also be configured to generate the corresponding depth values for the first face 124, which may thus be written to the depth buffer 140 of the GPU 107. In other words, the depth mask generator 138 effectively rasterizes the portion of the vector image 118 represented by the first face 124 by assigning pixel values for individual face pixels of the first face 124. However, instead of assigning color values at this stage, the depth mask generator 138 assigns a depth value for each face pixel of the rasterized first face 124 within the depth buffer 140. In this way, for example, a single depth value is assigned to each face pixel in the first face 124. Of course, similar comments would apply with respect to assigning face pixel values within the depth buffer 140 that correspond to a determined depth of the second face 126 within the vector image 118. As also described, it may occur that the depth values for each of the first face 124 and the second face 126 may be equal, since the faces 124, 126 are not overlapping within the vector image 118. However, as also described with respect to FIG. 3, overlapping faces will be assigned different depth values within the depth buffer 140.

The face pixels may be mapped to corresponding color pixels of the color pixels of the raster image, based on the depth value, to obtain color values for the face pixels (406). For example, the mapping engine 146 may be configured to map each pixel of the colorized raster image 120 to each corresponding pixel of the vector image 118. Consequently, each face pixel of the first face 124 will be mapped to a corresponding color value of a corresponding pixel of the first portion 128 within the colorized raster image 120. Of course, as described above, this mapping, in this specific example, would also include mapping pixel color values within the portion 129 to corresponding face pixels of the first face 124. In the specific example of FIG. 1, the fragment shader 148 may assign a color value for each pixel of the colorized raster image 120, such as may be determined by the colorizing neural network 144. In such cases, then, it may occur that the mapping engine 146 simply maps face pixels from the depth buffer 140 having a particular depth value to corresponding pixels stored within the fragment shader 148.

A color derived from the color values may be assigned to the face, to obtain a colorized vector image (408). For example, the mapping engine 146 may be configured to assign a single color value to all pixels within the first face 132 within the colorized vector image 122, notwithstanding the fact that the first portion 128 of the colorized raster image 120 includes the differently-colored portion 129. In short, as described in more detail below, the mapping engine 146 may be configured to reduce or remove pixel noise or distortion that may occur during normal operations of the colorizing neural network 144, so that the first face 132 has, e.g., a single, uniform color. Of course, in some examples, the mapping engine 146 may be configured to map multiple colors derived from the color values, if configured accordingly.

It will be appreciated that the flowchart of FIG. 4 represents a high level example corresponding to operations of the system 100 of FIG. 1 that may occur in many different specific implementations of the system 100 of FIG. 1. FIG. 5 is a flowchart illustrating more detailed examples of more specific implementations of the system 100 of FIG. 1, and of the flowchart of FIG. 4.

Figure 5:
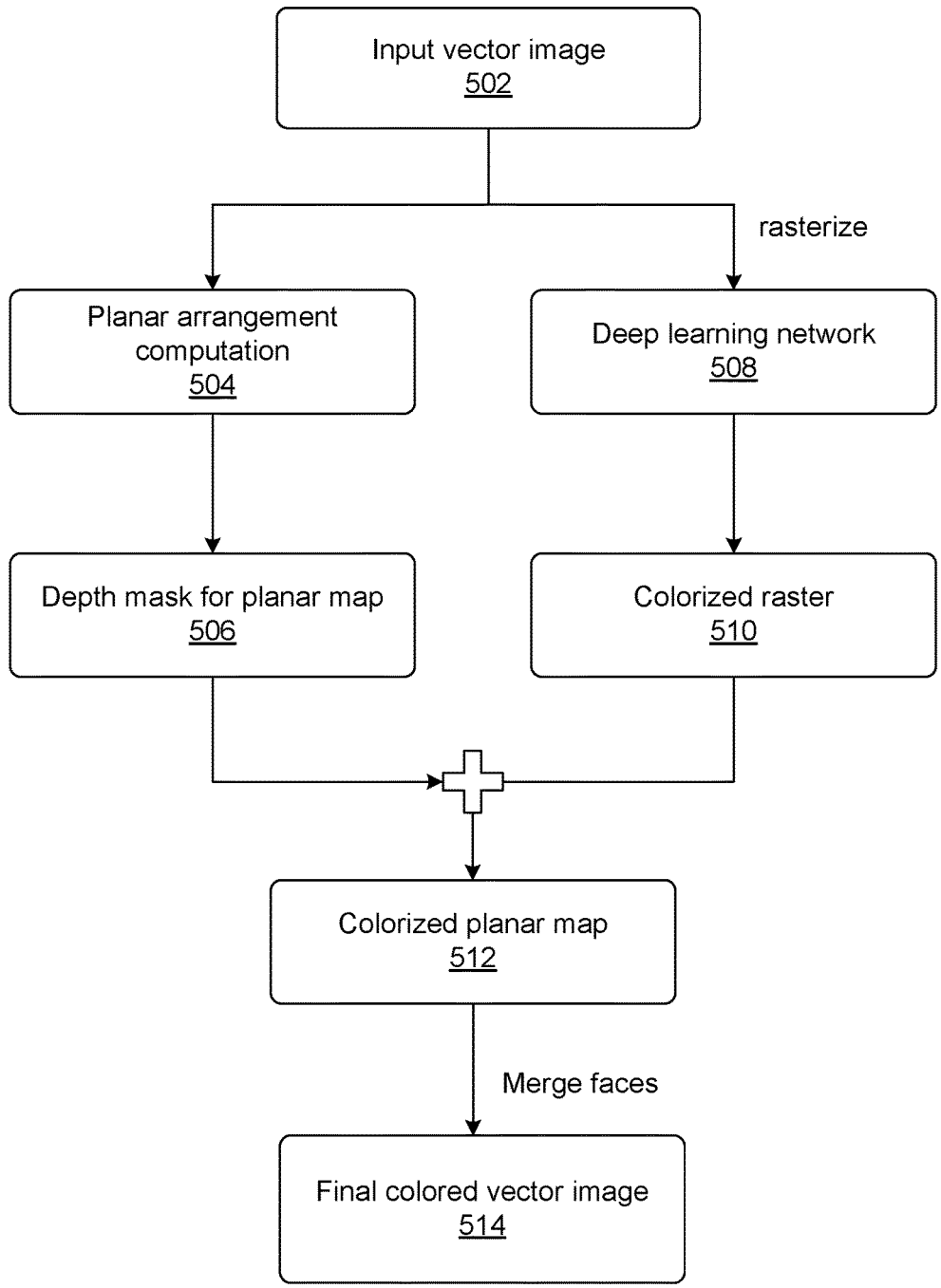
FIG. 5 is a flowchart illustrating more detailed example operations of the system of FIG. 1.

In the example of FIG. 5, some of the scenarios referenced above are illustrated, in which a process begins with the input of a single vector image (502). However, as also referenced above, it is not necessary to begin with a vector image. For example, a raster image may provide an original input, and may then undergo vectorization to obtain a vector image for further operations. In this regard, it will be appreciated that various techniques for vectorization generally include segmenting the input image using edge detection, and then computing colors for each of the contours in the segmented image. Various methods are available for image segmentation, and also for generating the vector outlines for segmented images. Once vector outlines have been generated, the remainder of the relevant operations of FIG. 5 may be used to transfer color from the original, input raster image to produce a colorized vector image (such as in FIG. 9, below).

In FIG. 5, the input vector image may then be analyzed to obtain a planar arrangement of faces included therein, as described above (504). For example, FIG. 6 illustrates a vector image having various defined geometric paths, and to which various faces 602-614 have been assigned/mapped. As shown, a face 602 corresponds to a shirt, face 604 to a first collar portion, face 606 to a second collar portion, face 608 to a man's face, face 610 to an eye, face 612 to hair, and face 614 to a hat. As shown in each of subsequent FIGS. 7-9, the same faces are numbered with corresponding reference numerals therein, but each in a series corresponding to the figure number itself, i.e., 7xx, 8xx, 9xx.

As also described above, a corresponding depth mask for the resulting planar map may be obtained (506), such that each determined face of the calculated planar arrangement of the input vector image is mapped to at least one geometric path of the input vector image. Specifically, the depth mask may be computed using a suitable programmable GPU graphics pipeline, such as may be associated with the GPU 107 of FIG. 1.

That is, the planar arrangement of operation 504 ensures that non-overlapping faces are generated from the input vector image, so that it is possible to assign a unique depth value to each of a set of pixels corresponding to a given face, e.g., by rasterizing the pixels into the depth buffer 140 in sequence. By way of specific, non-limiting example, pseudo code 1 illustrates an example code snippet for rasterizing faces into the depth buffer 140, with a unique depth value for each face:

---
Pseudocode 1
---
```
glEnable(GL_DEPTH_TEST);
glDepthFunc(GL_ALWAYS);
glColorMask(GL_FALSE, GL_FALSE, GL_FALSE, GL_FALSE);
glDepthMask(GL_TRUE);
glClear(GL_COLOR_BUFFER_BIT | GL_STENCIL_BUFFER_BIT | GL_DEPTH_BUFFER_BIT);
for (int i = 0; i < path_count; ++i)
{
    glMatrixPushEXT(GL_MODELVIEW); Transform3x2 mat;
    mul(mat, view, model);
    scale(mat, canvas_width/(float)svg_width, canvas_height/(float)svg_height);
    MatrixLoadToGL(mat);
    glTranslatef(0, 0, 0.0001* (i + 1)); drawFace(i);
    glMatrixPopEXT(GL_MODELVIEW);
}
glColorMask(GL_TRUE, G
glDepthMask(GL_FALSE);
```
---

FIG. 7 illustrates an example depth mask for the planar arrangement of FIG. 6. As shown, each pixel is assigned a depth value along a range of depth values defined between 0 and 1. In practice, a depth mask generated by pseudocode 1 or similar pseudocode may be implemented using a continuous grayscale range.

Further in FIG. 5, the input vector image may be rasterized and passed to a suitable deep learning network (508), to obtain a colorized raster therefrom (510). In specific examples, the rasterizer 142 and the colorizing neural network 144 may represent predetermined (e.g., pre-trained) modules for converting the input vector image into a raster image, and then utilizing a trained network to predict individual color values for individual pixels of the rasterized image.

Figure 8:
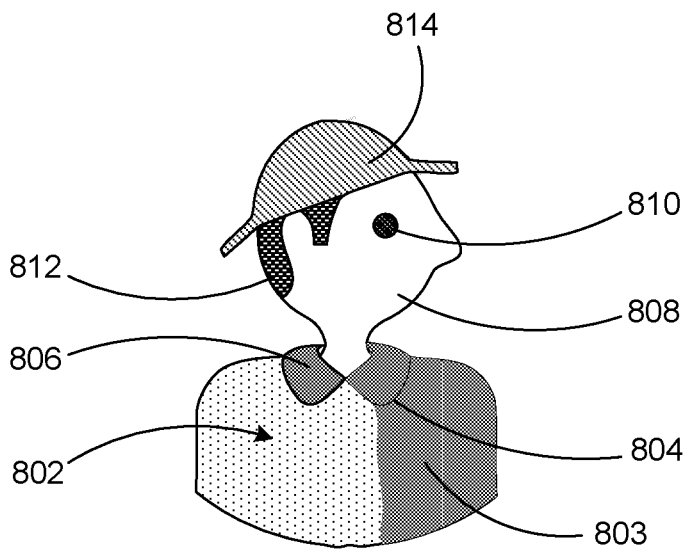
FIG. 8 illustrates a colorized raster image corresponding to the example image of FIG. 6, generated using the system of FIG. 1.

FIG. 8 illustrates an example of such a colorized raster image. As illustrated, different portions of FIG. 8 have different colors, as defined in the associated legend or key of colors. In particular, portions 802 and 803 represent the type of situation referenced above with respect to portions 128, 128 of FIG. 1, in which a range of color values may exist within a single colorized raster portion. In the simplified example, the portion 802 corresponds to pixels with a dark blue color value(s), while a portion 803 corresponds to light blue color values. In practice, the entire portion 802/803 of pixels corresponding to the face 702 may have a range of (e.g., blue) values.

Following completion of operations 506, 508, the mapping engine 146 of FIG. 1 may proceed to map depth mask pixels of the depth mask of FIG. 7 to the pixels of the colorized raster image of FIG. 8, to thereby obtain a colorized planar map (512). As described above, it is thus possible to rasterize each planar face and texture map it to the colorized raster image, and use a depth test (with each corresponding z-value) to accumulate the colorized pixels for that face.

For example, corresponding operations may be performed using the fragment shader stage 148 the OpenGL graphics pipeline, using atomic counter(s) 150. Thus, once the fragment shader execution is complete, the values of these atomic counters may be copied into the memory of the CPU 106, whereupon an average value of color is assigned to the corresponding path of the original vector image corresponding to the face in question.

Pseudocode 2 provides example pseudocode for the fragment shader 148 and atomic counter(s) 150.

Pseudocode 2

```
"#extension GL__ARB__shader__atomic__counters : enable\n"
"layout(binding = 0, offset = 0) uniform atomic__unit count__red;\n"
"layout(binding = 0, offset = 4) uniform atomic__unit count__green;\n"
"layout(binding = 0, offset = 8) uniform atomic__unit count__blue;\n"
"layout(binding = 0, offset = 12) uniform atomic__unit
pixel__count;\n"
"out vec4 color;\n"
"uniform sampler2D diffuse__tex;\n"
"in vec2 fragTexCoord;\n"
"void main( )\n"
"    {\n"
"color = texture(diffuse__tex, fragTexCoord).rgba;\n"
"  int red = int(255.0 * color.r);\n"
"  int green = int(255.0 * color.g);\n"
"  int blue = int(255.0 * color.b);\n"
"  for(int i=0;i<red;i++)\n"
"  atomicCounterIncrement(count__red);\n"
"  for(int i=0;i<green;i++)\n"
"  atomicCounterIncrement(count__green);\n"
"  for(int i=0;i<blue;i++)\n"
"  atomicCounterIncrement(count__blue);\n"
"  atomicCounterIncrement(pixel__count); \n"
"    {\n"
```

Figure 9:
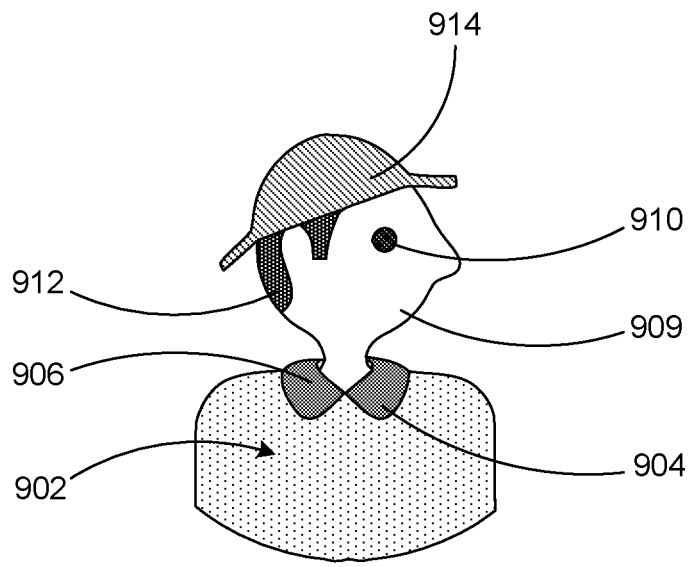
FIG. 9 illustrates a colorized vector image corresponding to the example image of FIG. 6, generated using the system of FIG. 1.

In particular, as shown in the resulting example of FIG. 9, the face/portion 902 corresponding to the shirt is now illustrated as having a single color of 'dark blue.'

Finally in FIG. 5, a final color vector image is provided (514). For example, if necessary, any path to which multiple faces have been mapped may be merged by the merging engine 152. That is, the number of faces colorized may be greater than the number of paths in the input vector image. The previously-computed path-to-face mapping generated by the face detector 136 may be utilized to complete any necessary merging. For example, if all the faces belonging to a single input path have been assigned the same color, those faces may be merged to create a single path, thereby reducing the number of paths in the final output vector image. For example, otherwise-standard Boolean operations on shapes may be used.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
receive a vector image, the vector image corresponding to a raster image that includes colored pixels;
generate face pixels of a face within a planar map of the vector image, the face having a depth value within the vector image;
obtain color values for the face pixels, including mapping the face pixels to corresponding colored pixels of the colored pixels of the raster image, based on the depth value; and
assign a color derived from the color values to the face, to obtain a colorized vector image.

2. The computer program product of claim 1, wherein the instructions, when executed to input the vector image, are further configured to cause the at least one computing device to:
receive the raster image; and
vectorize the raster image to obtain the vector image.

3. The computer program product of claim 1, wherein the instructions, when executed to receive the vector image, are further configured to cause the at least one computing device to:
rasterize the vector image to obtain a rasterized image; and
assign a color value to each pixel of the rasterized image, based on a trained model of a neural network, to thereby obtain the raster image that includes colored pixels.

4. The computer program product of claim 1, wherein the instructions, when executed to generate the face pixels, are further configured to cause the at least one computing device to:
determine, within the vector image, a plurality of geometric paths; and
define, in terms of the plurality of geometric paths, a plurality of faces within the planar map of the vector image, the plurality of faces including the face.

5. The computer program product of claim 1, wherein the instructions, when executed to generate the face pixels, are further configured to cause the at least one computing device to:
determine, within the vector image, at least two geometric paths, including a first geometric path with an overlapping portion of a second geometric path, wherein the first geometric path has the depth value and the second geometric path has a second depth value; and
define at least two faces within the first geometric path, the at least two faces including the face.

6. The computer program product of claim 1, wherein the instructions, when executed to generate the face pixels, are further configured to cause the at least one computing device to:
determine, within the vector image, a plurality of geometric paths, each geometric path associated with a depth value; and
define the planar map as including non-overlapping faces contained within the plurality of geometric paths, based on overlapping portions of the plurality of geometric paths, the non-overlapping faces including the face, wherein each of the non-overlapping faces has a depth value corresponding to a depth value of its corresponding geometric path.

7. The computer program product of claim 6, wherein the instructions, when executed to define the face pixels, are further configured to cause the at least one computing device to:
rasterize the face into a depth mask stored using a depth buffer of a graphics processing unit, including storing the face pixels within the depth buffer in association with the depth value.

8. The computer program product of claim 7, wherein the instructions, when executed to define the face pixels, are further configured to cause the at least one computing device to:
rasterize a second face of the vector image, having a second depth value, into the depth mask, in parallel with the rasterizing of the face, to thereby obtain second face pixels stored in association with the second depth value.

9. The computer program product of claim 7, wherein the instructions, when executed to map the face pixels, are further configured to cause the at least one computing device to:
colorize an original raster image using a neural network, to thereby obtain the raster image with colored pixels.

10. The computer program product of claim 9, wherein the instructions, when executed to map the face pixels, are further configured to cause the at least one computing device to:
assign and store color values for the colored pixels of the raster image using a fragment shader of the graphics processing unit;
accumulate the color values using at least one atomic counter of the fragment shader; and
derive the color to be assigned to the face pixels, based on the accumulated color values.

11. A computer-implemented method, the method comprising:
receiving a vector image, the vector image corresponding to a raster image that includes colored pixels;
generating face pixels of a face within a planar map of the vector image, the face having a depth value within the vector image;
obtaining color values for the face pixels, including mapping the face pixels to corresponding colored pixels of the colored pixels of the raster image, based on the depth value; and
assigning a color derived from the color values to the face, to obtain a colorized vector image.

12. The method of claim 11, wherein inputting the vector image further comprises:
receiving the raster image; and
vectorizing the raster image to obtain the vector image.

13. The method of claim 11, wherein inputting the vector image further comprises:
rasterizing the vector image to obtain the raster image.

14. The method of claim 11, wherein defining the face pixels further comprises:
determining, within the vector image, a plurality of geometric paths; and
defining, in terms of the plurality of geometric paths, a plurality of faces within the planar map of the vector image, the plurality of faces including the face.

15. The method of claim 11, wherein defining the face pixels further comprises:
determining, within the vector image, at least two geometric paths, including a first geometric path with an overlapping portion of a second geometric path, wherein the first geometric path has the depth value and the second geometric path has a second depth value; and
defining at least two faces within the first geometric path, the at least two faces including the face.

16. The method of claim 11, wherein defining the face pixels further comprises:
determining, within the vector image, a plurality of geometric paths, each geometric path associated with a depth value; and
defining the planar map as including non-overlapping faces contained within the plurality of geometric paths, based on overlapping portions of the plurality of geometric paths, the faces including the face, wherein each face has a depth value corresponding to a depth value of its corresponding geometric path.

17. The method of claim 16, wherein defining the face pixels further comprises:
rasterizing the face into a depth mask stored using a depth buffer of a graphics processing unit.

18. The method of claim 11, wherein defining the face pixels further comprises:
colorizing an original raster image using a neural network, to thereby obtain the raster image with colored pixels.

19. A computer program product, the computer program product being tangibly embodied on a non-transitory computer-readable storage medium and comprising instructions that, when executed by at least one computing device, are configured to cause the at least one computing device to:
receive a vector image, the vector image including geometric paths;
colorize a raster image, using a neural network, to obtain a colorized raster image;
construct a depth mask for a planar map of the vector image, in which a first face and a second face of the planar map are defined with respect to an overlapping portion of at least two of the geometric paths;
rasterize the first face to obtain first face pixels, the first face pixels having a first depth value within the depth mask;
map corresponding pixels of the colorized rasterized image to the first face pixels, to obtain first color values for the first face pixels;
assign a first color, derived from the first color values, to the first face;
map corresponding pixels of the colorized rasterized image to the second face, to obtain second color values for second face pixels of the second face; and
assign a second color, derived from the second color values, to the second face.

20. The computer program product of claim 19, wherein the instructions, when executed to input the vector image, are further configured to cause the at least one computing device to:
rasterize the vector image to obtain the raster image.

* * * * *